(12) United States Patent
Wehr et al.

(10) Patent No.: US 11,334,467 B2
(45) Date of Patent: May 17, 2022

(54) REPRESENTING SOURCE CODE IN VECTOR SPACE TO DETECT ERRORS

(71) Applicant: International Business Machines Corporation, Armonk, NY (US)

(72) Inventors: David Wehr, Sigourney, IA (US); Eleanor Pence, Cambridge, MA (US); Halley Fede, Cambridge, MA (US); Isabella Yamin, San Francisco, CA (US); Alexander Sobran, Sunnyvale, CA (US); Bo Zhang, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 643 days.

(21) Appl. No.: 16/402,965

(22) Filed: May 3, 2019

(65) Prior Publication Data
US 2020/0349052 A1   Nov. 5, 2020

(51) Int. Cl.
*G06F 11/00* (2006.01)
*G06F 11/36* (2006.01)
(Continued)

(52) U.S. Cl.
CPC .......... *G06F 11/3608* (2013.01); *G06F 8/427* (2013.01); *G06N 3/08* (2013.01)

(58) Field of Classification Search
CPC ............... G06F 11/302; G06F 11/3466; G06F 11/3604; G06F 11/3624; G06F 11/3664; G06F 11/362
See application file for complete search history.

(56) References Cited

U.S. PATENT DOCUMENTS

| 6,594,783 B1 | 7/2003 | Dollin et al. |
| 8,762,962 B2 | 6/2014 | Ben-Artzi et al. |

(Continued)

FOREIGN PATENT DOCUMENTS

WO   2016163901 A1   10/2016

OTHER PUBLICATIONS

Bui et al., "Hierarchical Learning of Cross-Language Mappings Through Distributed Vector Representations for Code," 40th International Conference on Software Engineering, Gothenburg, Sweden, May 27-Jun. 3, 2018, pp. 33-36.
(Continued)

*Primary Examiner* — Charles Ehne
(74) *Attorney, Agent, or Firm* — Robert A. Voigt, Jr.; Shackelford, Bowen, McKinley & Norton, LLP (57) ABSTRACT

A computer-implemented method, system and computer program product for representing source code in vector space. The source code is parsed into an abstract syntax tree, which is then traversed to produce a sequence of tokens. Token embeddings may then be constructed for a subset of the sequence of tokens, which are inputted into an encoder artificial neural network ("encoder") for encoding the token embeddings. A decoder artificial neural network ("decoder") is initialized with a final internal cell state of the encoder. The decoder is run the same number of steps as the encoding performed by the encoder. After running the decoder and completing the training of the decoder to learn the inputted token embeddings, the final internal cell state of the encoder is used as the code representation vector which may be used to detect errors in the source code.

20 Claims, 5 Drawing Sheets

(51) Int. Cl.
  *G06N 3/08* (2006.01)
  *G06F 8/41* (2018.01)

(56) References Cited

U.S. PATENT DOCUMENTS

| | | | |
|---|---|---|---|
| 9,361,094 B1* | 6/2016 | Xie | G06F 8/71 |
| 9,459,848 B1* | 10/2016 | Horie | G06F 8/437 |
| 10,929,211 B1* | 2/2021 | Mylavarapu | G06F 11/3466 |
| 2002/0129306 A1* | 9/2002 | Flanagan | G06F 9/524 714/100 |
| 2014/0236578 A1 | 8/2014 | Malon et al. | |
| 2017/0212740 A1 | 7/2017 | Lee et al. | |
| 2018/0060727 A1 | 3/2018 | Rainwater | |
| 2018/0129931 A1 | 5/2018 | Bradbury et al. | |
| 2018/0150742 A1* | 5/2018 | Woulfe | G06N 20/00 |

OTHER PUBLICATIONS

Pechenkin et al., "Applying Deep Learning and Vector Representation for Software Vulnerabilities Detection," 11th International Conference on Security of Information and Networks, Cardiff, United Kingdom, Sep. 10-12, 2018, pp. 1-6.

Alon et al., "code2vec: Learning Distributed Representations of Code," Proc. ACM Program. Lang., vol. 3, No. POPL, Article 40, Jan. 2019, pp. 1-29.

Gu et al., "Deep Code Search," 40th International Conference on Software Engineering, Gothenburg, Sweden, May 27-Jun. 3, 2018, pp. 1-12.

White et al., "Deep Learning Code Fragments for Code Clone Detection," 31st IEEE/ACM International Conference on Automated Software Engineering, Singapore, Singapore, Sep. 3-7, 2016, pp. 1-12.

Mou et al., "Convolutional Neural Networks over Tree Structures for Programming Language Processing," Proceedings of the Thirtieth AAAI Conference on Artificial Intelligence, Phoenix, Arizona, United States of America, Feb. 12-17, 2016, pp. 1287-1293.

Dam et al., "A Deep-Tree Based Model for Software Defect Prediction," Feb. 3, 2018, pp. 1-10.

Hu et al., "Deep Code Comment Generation," IEEE/ACM International Conference on Program Comprehension, Gothenburg, Sweden, May 27-28, 2018, pp. 1-11.

* cited by examiner

REPRESENTING SOURCE CODE IN VECTOR SPACE TO DETECT ERRORS

TECHNICAL FIELD

The present invention relates generally to analyzing source code using deep learning, and more particularly to representing source code in vector space to detect errors (e.g., duplicate code, software bugs).

BACKGROUND

Deep learning (also known as deep structured learning or hierarchical learning) is part of a broader family of machine learning methods based on learning data representations as opposed to task-specific algorithms. Learning can be supervised, semi-supervised or unsupervised.

Deep learning architectures, such as deep neural networks, deep belief networks and recurrent neural networks, have been applied to fields including computer vision, speech recognition, natural language processing, audio recognition, social network filtering, machine translation, bioinformatics, drug design and board game programs, where they have produced results comparable to and in some cases superior to human experts.

Deep learning architectures have also been applied to analyzing source code.

SUMMARY

In one embodiment of the present invention, a computer-implemented method for representing source code in vector space comprises parsing source code into an abstract syntax tree. The method further comprises traversing the abstract syntax tree to produce a sequence of tokens. The method additionally comprises constructing token embeddings for a subset of the sequence of tokens. Furthermore, the method comprises inputting the token embeddings into an encoder artificial neural network for encoding the token embeddings. Additionally, the method comprises initializing a decoder artificial neural network with a final internal cell state of the encoder artificial neural network when encoding the token embeddings. In addition, the method comprises running the decoder artificial neural network a same number of steps as encoding performed by the encoder artificial neural network. The method further comprises using the final internal cell state of the encoder artificial neural network as a code representation vector in response to completing the running of the decoder artificial neural network. The method additionally comprises using the code representation vector to detect errors in the source code.

Other forms of the embodiment of the computer-implemented method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a computer-implemented method, system and computer program product for representing source code in vector space. In one embodiment of the present invention, the source code is parsed into an abstract syntax tree. As used herein, an "abstract syntax tree" corresponds to a tree representation of the abstract syntactic structure of source code written in a programming language. The abstract syntax tree is traversed to produce a sequence of tokens. In one embodiment, "tokens," as used herein, refer to the words, phrases, symbols or other meaningful elements of the parsed source code. Token embeddings may then be constructed for a subset of the sequence of tokens. A "token embedding," as used herein, refers to a vector of a real number mapped to the token (e.g., word, phrase). These token embeddings are inputted into an autoencoder, and more specifically, an encoder artificial neural network (e.g., recurrent neural network) of the autoencoder for encoding the token embeddings. The decoder artificial neural network (e.g., recurrent neural network), which is part of the autoencoder, is initialized with a final internal cell state of the encoder artificial neural network when encoding the token embeddings. The decoder artificial neural network is run the same number of steps as the encoding performed by the encoder artificial neural network, where the internal states of the decoder cells (e.g., LSTM cells) are stored at each step. The final internal cell state of the encoder is used as the code representation vector after running the decoder artificial neural network the same number of steps as the encoding performed by the encoder artificial neural network and after the training of the decoder artificial neural network to learn the inputted token embeddings is completed. The code representation vector is used to summarize the code in a manner that maintains the latent variables in the source code with high fidelity. The code representation vector may then be used to detect errors in the source code. For example, code representation vectors may be mapped to use cases involving errors in the source code. When a code representation vector is identified as matching one of these code representation vectors mapped to a use case involving an error in the source code, then such a code representation vector may be said to detect such an error in the source code. In this manner, the embodiments of the present invention are able to more accurately detect errors (e.g., duplicate code, software bugs) by representing the source code in a high-dimensional vector space that maintains the latent variables in the source code with high fidelity.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
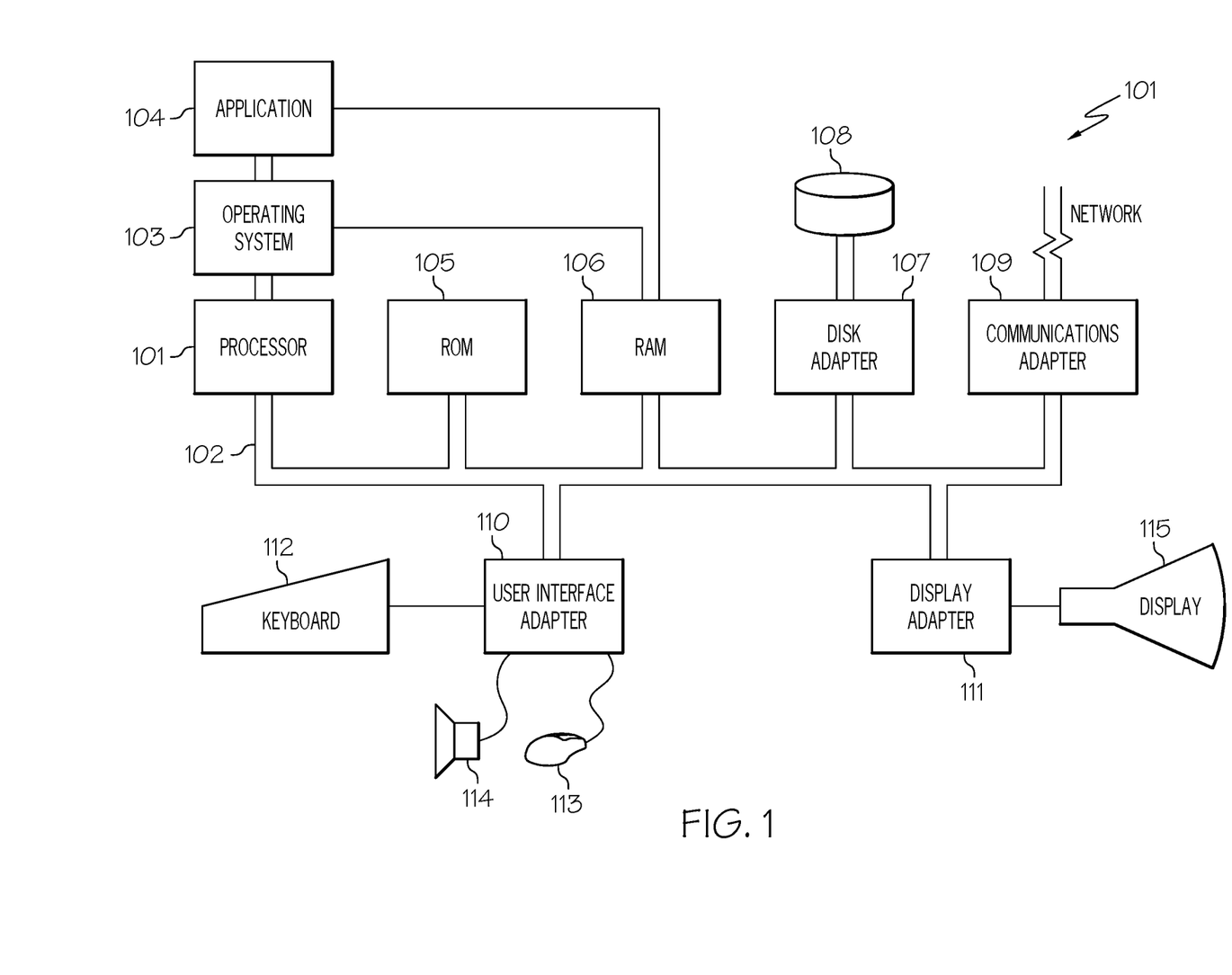
FIG. 1 illustrates an embodiment of the present invention of a hardware configuration of a computing device which is representative of a hardware environment for practicing the present invention.

Referring now to the Figures in detail, FIG. 1 illustrates an embodiment of the present invention of the hardware configuration of a computing device 100 which is representative of a hardware environment for practicing the present invention. Computing device 100 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of representing source code in high-dimensional vector space to detect errors (e.g., duplicate code, software bugs). Referring to FIG. 1, computing device 100 may have a processor 101 coupled to various other components by system bus 102. An operating system 103 may run on processor 101 and provide control and coordinate the functions of the various components of FIG. 1. An application 104 in accordance with the principles of the present invention may run in conjunction with operating system 103 and provide calls to operating system 103 where the calls implement the various functions or services to be performed by application 104. Application 104 may include, for example, a program for representing source code in high-dimensional vector space to detect errors (e.g., duplicate code, software bugs) as discussed further below in connection with FIGS. 2A-2B and 3-4.

Referring again to FIG. 1, read-only memory ("ROM") 105 may be coupled to system bus 102 and include a basic input/output system ("BIOS") that controls certain basic functions of computing device 100. Random access memory ("RAM") 106 and disk adapter 107 may also be coupled to system bus 102. It should be noted that software components including operating system 103 and application 104 may be loaded into RAM 106, which may be computing device's 100 main memory for execution. Disk adapter 107 may be an integrated drive electronics ("IDE") adapter that communicates with a disk unit 108, e.g., disk drive. It is noted that the program for representing source code in high-dimensional vector space to detect errors (e.g., duplicate code, software bugs), as discussed further below in connection with FIGS. 2A-2B and 3-4, may reside in disk unit 108 or in application 104.

Computing device 100 may further include a communications adapter 109 coupled to bus 102. Communications adapter 109 may interconnect bus 102 with an outside network thereby allowing computing device 100 to communicate with other devices.

I/O devices may also be connected to computing device 100 via a user interface adapter 110 and a display adapter 111. Keyboard 112, mouse 113 and speaker 114 may all be interconnected to bus 102 through user interface adapter 110. A display monitor 115 may be connected to system bus 102 by display adapter 111. In this manner, a user is capable of inputting to computing device 100 through keyboard 112 or mouse 113 and receiving output from computing device 100 via display 115 or speaker 114. Other input mechanisms may be used to input data to computing device 100 that are not shown in FIG. 1, such as display 115 having touch-screen capability and keyboard 112 being a virtual keyboard. Computing device 100 of FIG. 1 is not to be limited in scope to the elements depicted in FIG. 1 and may include fewer or additional elements than depicted in FIG. 1.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, deep learning (also known as deep structured learning or hierarchical learning) is part of a broader family of machine learning methods based on learning data representations as opposed to task-specific algorithms. Learning can be supervised, semi-supervised or unsupervised. Deep learning architectures, such as deep neural networks, deep belief networks and recurrent neural networks, have been applied to fields including computer vision, speech recognition, natural language processing, audio recognition, social network filtering, machine translation, bioinformatics, drug design and board game programs, where they have produced results comparable to and in some cases superior to human experts. Deep learning architectures have also been applied to analyzing source code. However, such deep learning architectures do not accurately detect errors in the source code, such as duplicate code or software bugs, in part, because such deep learning architectures do not detect or analyze the latent factors/variables. Latent variables are variables that are not directly observed but are inferred from other variables that are observed. These latent variables may be the source of errors, such as software bugs.

Figure 2A:
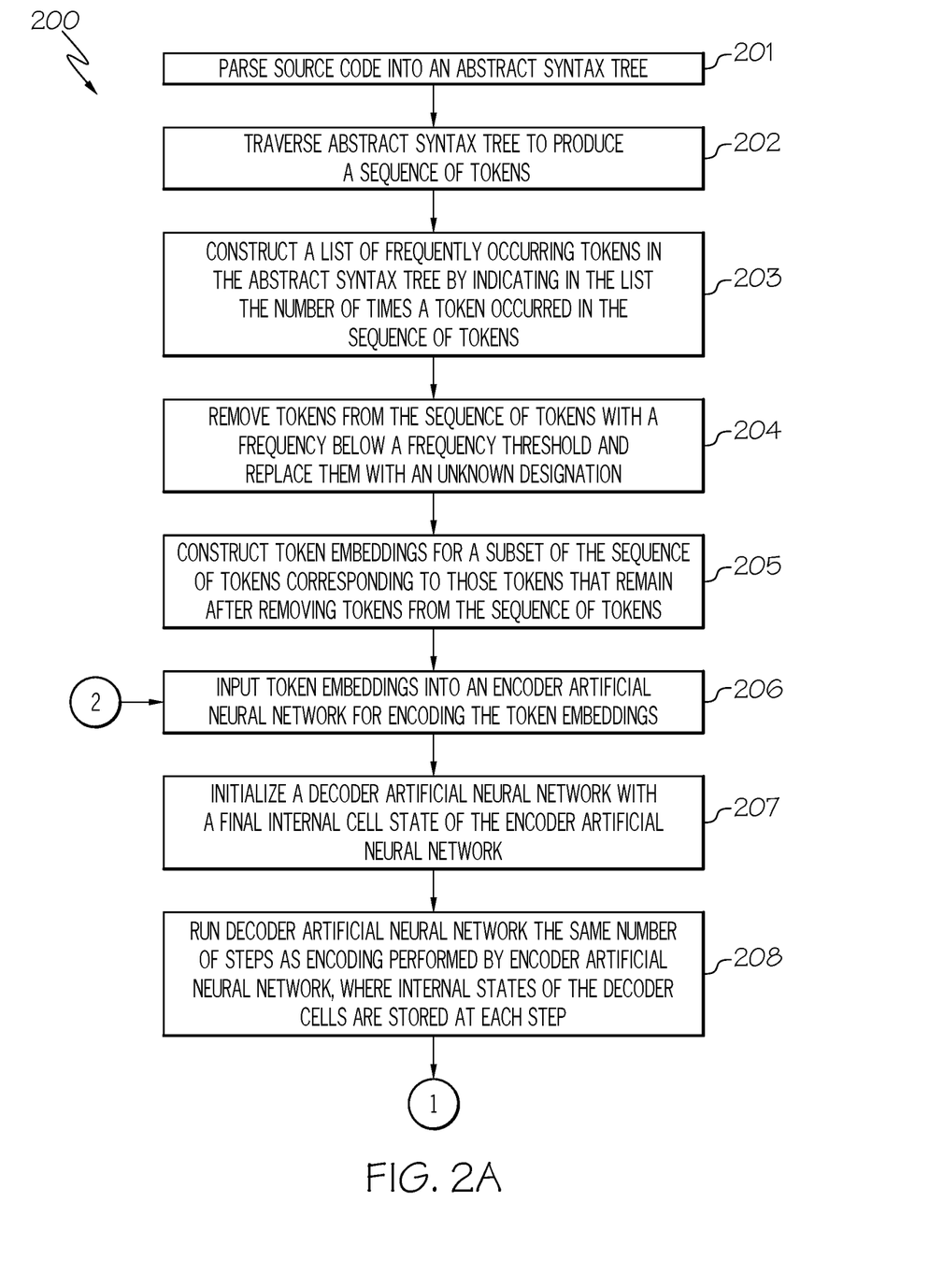
FIGS. 2A-2B are a flowchart of a method for representing source code in high-dimensional vector space in a manner that ensures that the latent variables in the source code are maintained with high fidelity in accordance with an embodiment of the present invention.
Figure 2B:
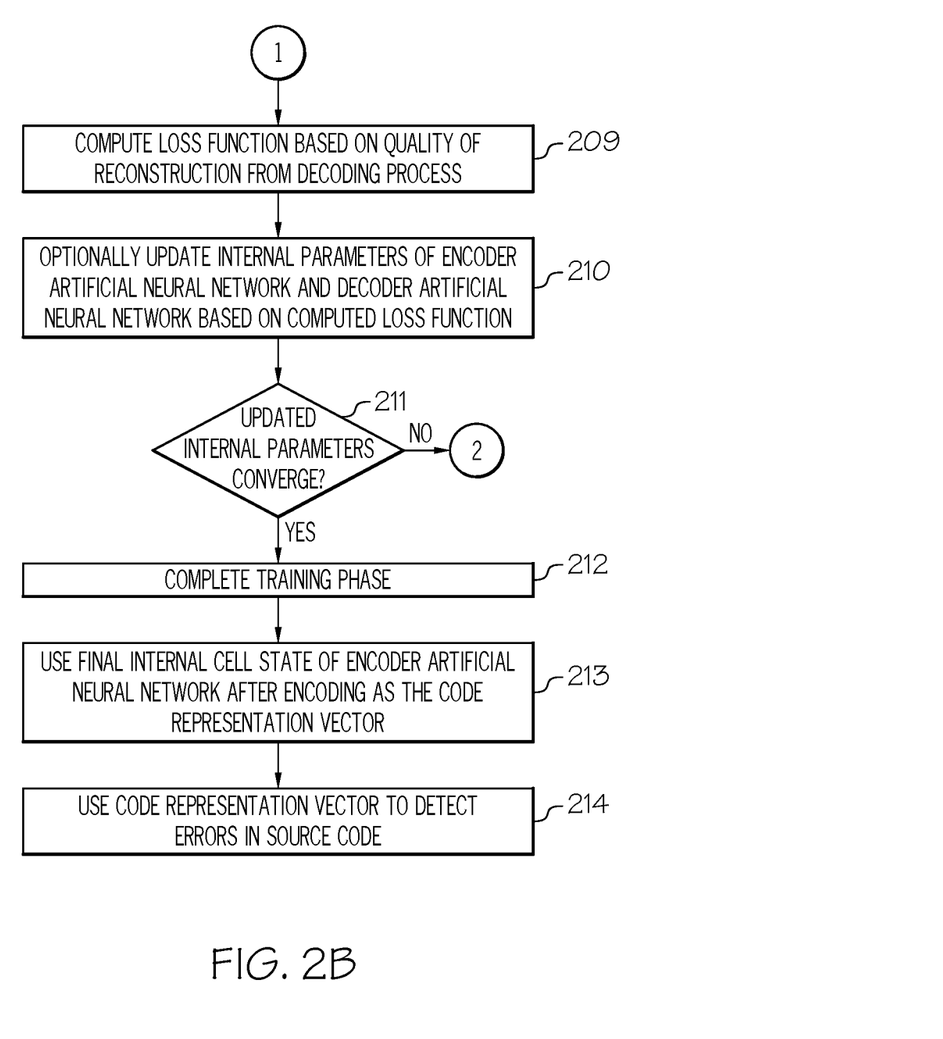
Figure 3:
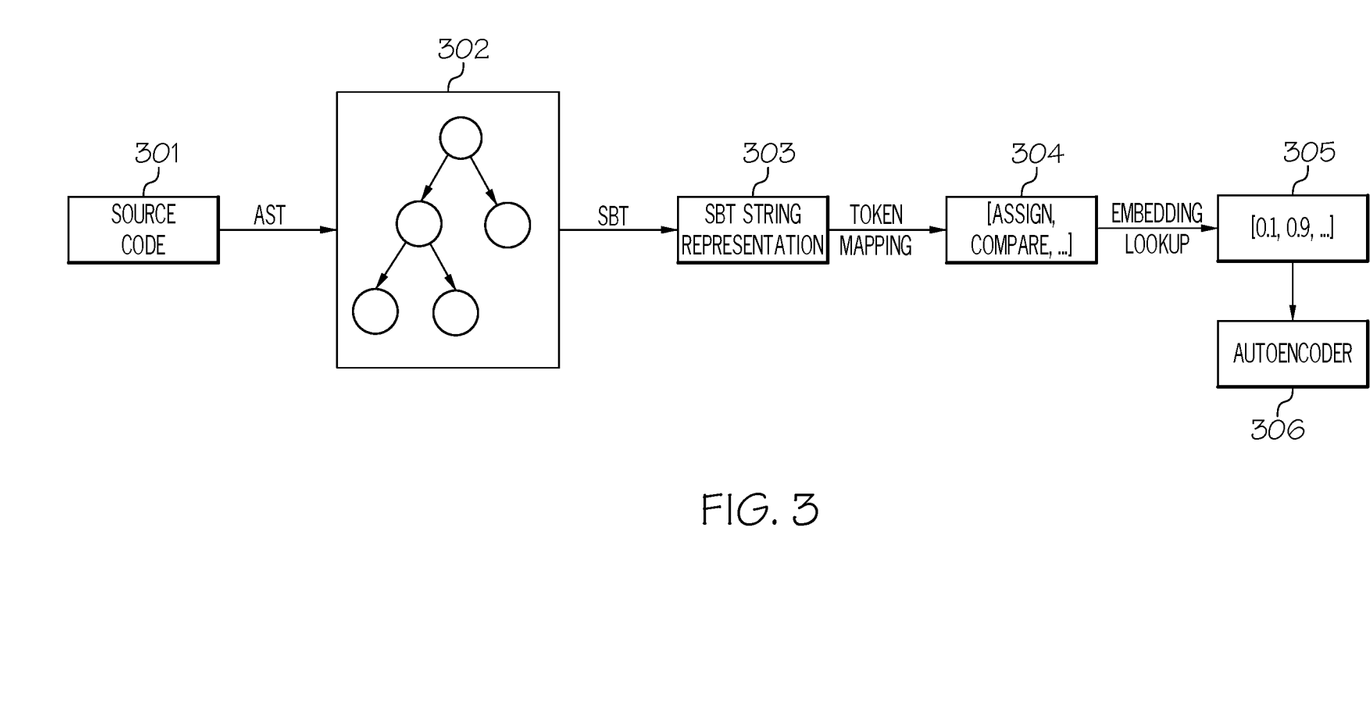
FIG. 3 is a diagram illustrating the process of representing source code in high-dimensional vector space in accordance with an embodiment of the present invention.
Figure 4:
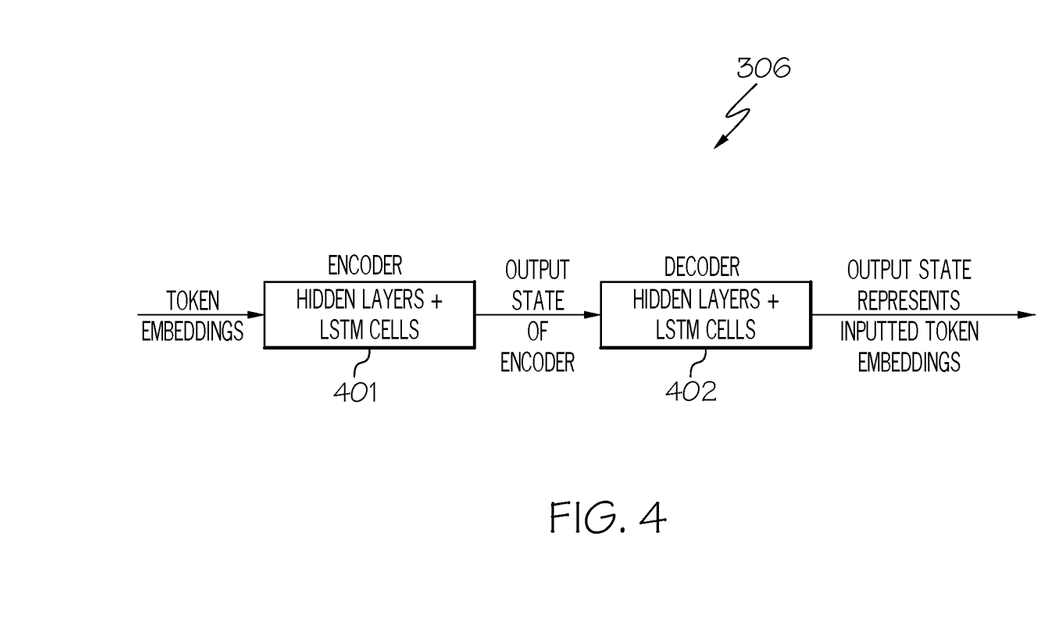
FIG. 4 illustrates the architecture of an autoencoder used to learn efficient data codings in an unsupervised manner in accordance with an embodiment of the present invention.

The embodiments of the present invention provide a means for mapping source code to vector space in a manner that ensures that the latent variables in the source code are maintained with high fidelity. Deep learning methodologies are effective at solving many problems and typically require their datasets be represented as vectors. However, as discussed above, such deep learning methodologies fail to consider the latent variables when analyzing source code, and therefore, may not accurately detect errors in the source code. By the present invention mapping the source code to vector space in a manner that ensures that the latent variables in the source code are maintained with high fidelity, deep learning methodologies will be better able to analyze the source code and detect errors as discussed below in connection with FIGS. 2A-2B and 3-4. FIGS. 2A-2B are a flowchart of a method for representing source code in high-dimensional vector space in a manner that ensures that the latent variables in the source code are maintained with high fidelity. FIG. 3 is a diagram illustrating the process of representing source code in high-dimensional vector space. FIG. 4 illustrates the architecture of an autoencoder used to learn efficient data codings in an unsupervised manner.

As stated above, FIGS. 2A-2B are a flowchart of a method 200 for representing source code in high-dimensional vector space in a manner that ensures that the latent variables in the source code are maintained with high fidelity in accordance with an embodiment of the present invention.

Referring to FIG. 2A, in conjunction with FIG. 1, in step 201, computing device 100 parses the source code into an abstract syntax tree as illustrated in FIG. 3 (discussed further below). As used herein, an "abstract syntax tree" corresponds to a tree representation of the abstract syntactic structure of source code written in a programming language. Each node of the tree denotes a construct occurring in the source code. The syntax is "abstract" in the sense that it does not represent every detail appearing in the real syntax, but rather just the structural, content-related details. By utilizing the abstract syntax tree as the base representation, the present invention is able to capture the entirety of the program's implementation, including the latent variables.

Referring now to FIG. 3, FIG. 3 is a diagram illustrating the process of representing source code in high-dimensional vector space in accordance with an embodiment of the present invention. As shown in FIG. 3, source code 301 is parsed into an abstract syntax tree (AST) 302.

Returning to FIG. 2A, in conjunction with FIGS. 1 and 3, in step 202, computing device 100 traverses the abstract syntax tree to produce a sequence of tokens. In one embodiment, such traversal is a form of graph traversal that visits each node in the tree data structure. In one embodiment, "tokens," as used herein, refer to the words, phrases, symbols or other meaningful elements of the parsed source code.

In one embodiment, the abstract syntax tree is traversed using a depth-first traversal. In the depth-first traversal, the traversal visits all the descendants (i.e., keeps going deeper) in one branch (or child) of the tree structure prior to visiting that branch's siblings.

In one embodiment, the abstract syntax tree is traversed using a structure-based traversal method as shown in FIG. 3. Referring to FIG. 3, the abstract syntax tree is traversed using the structure-based traversal (SBT) method to generate an SBT string representation 303 which is used to produce a sequence of tokens 304. By using the structure-based traversal method to traverse the abstract syntax tree, the abstract syntax tree can be restored unambiguously from the sequence (abstract syntax tree sequence) generated using the structure-based traversal method.

Returning to FIG. 2A, in conjunction with FIGS. 1 and 3, in step 203, computing device 100 constructs a list (or vocabulary) of frequently occurring tokens in the abstract syntax tree by indicating in the list the number of times a token occurred in the sequence of tokens produced in step 202.

In step 204, computing device 100 removes the tokens from the sequence of tokens produced in step 202 with a frequency below a frequency threshold thereby forming a subset of the sequence of tokens produced in step 202 and replacing them (those tokens that were removed) with an unknown designation (e.g., "<UNK>"). In one embodiment, the frequency threshold is a percentage of all tokens in the sequence of tokens. In one embodiment, the frequency threshold is a number, such as a user-designated number.

In step 205, computing device 100 constructs the token embeddings 305 for a subset of the sequence of tokens corresponding to those tokens that remain after removing tokens from the sequence of tokens in step 204 as shown in FIG. 3. A "token embedding," as used herein, refers to a vector of a real number mapped to the token (e.g., word, phrase).

In one embodiment, the token embeddings are randomly constructed. In another embodiment, pretrained embeddings are used to construct the token embeddings, such as via a table lookup ("embedding lookup" as shown in FIG. 3).

In step 206, computing device 100 inputs the token embeddings into an autoencoder 306 as shown in FIG. 3, and more specifically, an encoder artificial neural network (e.g., recurrent neural network) of autoencoder 306 for encoding the token embeddings. An example of an artificial neural network is a recurrent neural network where connections between nodes form a directed graph along a temporal sequence which allows it to exhibit temporal dynamic behavior. Furthermore, recurrent neural networks can use their internal state (memory) to process sequences of inputs. By utilizing token embeddings based on the sequence of tokens produced by traversing the abstract syntax tree, which are then inputted into autoencoder 306, the latent variables in the source code are able to be maintained with high fidelity.

"Encoding," as used herein, refers to the process of converting the token embeddings into symbols. "Decoding," as used herein, is the reverse process, converting code symbols back into the original form of the token embeddings.

In one embodiment, autoencoder 306 includes both an encoder and a decoder as shown in FIG. 4.

FIG. 4 illustrates the architecture of autoencoder 306 (FIG. 3) used to learn efficient data codings in an unsupervised manner in accordance with an embodiment of the present invention.

Referring to FIG. 4, autoencoder 306 includes an encoder 401 (encoder artificial neural network) that receives the token embeddings to be converted into symbols. In one embodiment, encoder 401 is a dynamic recurrent neural network that includes hidden layers and LSTM (long short-term memory) cells. The generated output state of encoder 401 is inputted to a decoder 402 (decoder artificial neural network) that includes hidden layers and LSTM cells, where the output state represents the inputted token embeddings.

Architecturally, autoencoder 306 is a feedforward, non-recurrent neural network, having an input layer (encoder), an output layer (decoder) and one or more hidden layers connecting them with the output layer having the same number of nodes as the input layer with the purpose of reconstructing its own inputs. In this manner, autoencoder 306 is an unsupervised learning model.

In one embodiment, the hidden layers of autoencoder 306 correspond to LSTM layers that return the hidden and cell state for all the cells in the layer.

In one embodiment, the final hidden and internal cell state from encoder 401 is used to initialize the state of decoder 402. As a result, every time encoder 401 encodes an input sequence, the final internal states of encoder 401 are used as the starting point for outputting the first character/number in the output sequences. As a result, in one embodiment, the encoder and decoder LSTM layers have the same number of cells.

Furthermore, in one embodiment, the output of decoder 402 (decoder artificial neural network) is used for training decoder 402 to learn the inputted token embeddings. Specifically, if the output of encoder 401 can be converted back into the original code using decoder 402, then the encoding is deemed to contain the same information as the original source.

Returning to FIG. 2A, in conjunction with FIGS. 1 and 3-4, in step 207, computing device 100 initializes decoder artificial neural network 402 (e.g., recurrent neural network) with a final internal cell state of encoder artificial neural network 401 when encoding the token embeddings.

In step 208, computing device 100 runs decoder artificial neural network 402 (e.g., recurrent neural network) the same number of steps as encoding performed by encoder artificial neural network 401, where the internal states of the decoder cells (e.g., LSTM cells) are stored at each step.

Referring to FIG. 2B, in conjunction with FIGS. 1 and 3-4, in step 209, computing device 100 computes a loss function based on the quality of the reconstruction from running decoder 402 (decoder artificial neural network). In one embodiment, the loss function maps the difference between the output state of decoder 402 to the inputted token embeddings onto a real number intuitively representing a "cost" associated with the difference. The greater the cost, the greater the error in correctly training decoder 402 to learn the inputted token embeddings. When such a cost exceeds a threshold, internal parameters of autoencoder 306 are adjusted to improve the training of decoder 402 to learn the inputted token embeddings.

In step 210, computing device 100 optionally updates the internal parameters of encoder 401 (encoder artificial neural network) and decoder 402 (decoder artificial neural network) based on the computed loss function if the loss is great, such as exceeding a threshold, which may be user-selected. For example, the internal parameters of decoder

402 may be updated based, at least in part, on the stored internal states of the decoder cells in step 208. Furthermore, in one embodiment, computing device 100 may optionally update an embedding matrix, which may be used to construct token embeddings for the tokens in step 205. In one embodiment, the embedding matrix is a linear mapping from the original space to a real-valued space, such as a mapping from a token to a pretrained token embedding.

In step 211, if the internal parameters of encoder 401 and decoder 402 were updated, a determination is made by computing device 100 as to whether the updated internal parameters of encoder 401 and decoder 402 converge. "Convergence," as used herein, refers to the magnitude of the updates to the internal parameters of encoder 401 and decoder 402 being below a threshold, which may be user-specified.

If the updated internal parameters of encoder 401 and decoder 402 do not converge, then computing device 100 inputs the token embeddings into autoencoder 306 in step 206.

If, however, the updated internal parameters of encoder 401 and decoder 402 converge, then, in step 212, the training phase (training decoder 402 to learn the inputted token embeddings) is said to be completed. After training is completed, autoencoder 306 can be used for inference by only executing the steps up through the encoding stage since the encoding is the final code embedding, which is discussed below. In one embodiment, the training phase may be completed based on simply running decoder 402 the same number of steps as encoding performed by encoder 401 (see step 208) if the computed loss function indicates a high quality of reconstruction from the decoding process (i.e., computed cost does not exceed a threshold).

In step 213, computing device 100 uses the final internal cell state of encoder 401 (encoder artificial neural network) after encoding as the code representation vector in response to completing the running of decoder artificial neural network 402 in step 208 and completing the training phase, which may or may not involve updating the internal parameters of encoder 401 and decoder 402. Such a code representation vector is used to summarize the code in such a manner that ensures that the latent variables in the source code are maintained with high fidelity. That is, the code representation vector is a general vector that summarizes the source code rather than a representation for a specific purpose. These general vectors can then be used for various applications, including duplicate code detection, software bug detection, etc. Furthermore, the code representation vector is indicative of the functionality of the source code, in part, because of ensuring that the latent variables in the source code are maintained with high fidelity.

In step 214, computing device 100 uses the code representation vector to detect errors in the source code. For example, code representation vectors may be mapped to use cases involving errors in the source code. When a code representation vector is identified as matching one of these code representation vectors mapped to a use case involving an error in the source code, then such a code representation vector may be said to detect such an error in the source code.

In this manner, the embodiments of the present invention are able to more accurately detect errors (e.g., duplicate code, software bugs) by representing the source code in a high-dimensional vector space that maintains the latent variables in the source code with high fidelity.

Furthermore, the present invention improves the technology or technical field involving software analysis. As discussed above, deep learning (also known as deep structured learning or hierarchical learning) is part of a broader family of machine learning methods based on learning data representations as opposed to task-specific algorithms. Learning can be supervised, semi-supervised or unsupervised. Deep learning architectures, such as deep neural networks, deep belief networks and recurrent neural networks, have been applied to fields including computer vision, speech recognition, natural language processing, audio recognition, social network filtering, machine translation, bioinformatics, drug design and board game programs, where they have produced results comparable to and in some cases superior to human experts. Deep learning architectures have also been applied to analyzing source code. However, such deep learning architectures do not accurately detect errors in the source code, such as duplicate code or software bugs, in part, because such deep learning architectures do not detect or analyze the latent factors/variables. Latent variables are variables that are not directly observed but are inferred from other variables that are observed. These latent variables may be the source of errors, such as software bugs.

The present invention improves such technology by representing source code in a high-dimensional vector space thereby maintaining the latent variables in the source code with high fidelity and allowing errors (e.g., software bugs) to be detected in the source code more accurately. By being able to more accurately detect errors in the source code, there is an improvement in the technical field of software analysis.

The technical solution provided by the present invention cannot be performed in the human mind or by a human using a pen and paper. That is, the technical solution provided by the present invention could not be accomplished in the human mind or by a human using a pen and paper in any reasonable amount of time and with any reasonable expectation of accuracy without the use of a computer.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for representing source code in vector space, the method comprising:
    parsing source code into an abstract syntax tree;
    traversing said abstract syntax tree to produce a sequence of tokens;
    constructing token embeddings for a subset of said sequence of tokens;
    inputting said token embeddings into an encoder artificial neural network for encoding said token embeddings;
    initializing a decoder artificial neural network with a final internal cell state of said encoder artificial neural network when encoding said token embeddings;
    running said decoder artificial neural network a same number of steps as encoding performed by said encoder artificial neural network;
    using said final internal cell state of said encoder artificial neural network as a code representation vector in response to completing said running of said decoder artificial neural network; and using said code representation vector to detect errors in said source code.

2. The computer-implemented method as recited in claim 1, wherein said abstract syntax tree is traversed using a depth-first traversal.

3. The computer-implemented method as recited in claim 1, wherein said abstract syntax tree is traversed using a structure-based traversal.

4. The computer-implemented method as recited in claim 1 further comprising:
constructing a list of frequently occurring tokens found in said abstract syntax tree; and
removing tokens from said sequence of tokens with a frequency below a frequency threshold to form said subset of said sequence of tokens.

5. The computer-implemented method as recited in claim 1, wherein said token embeddings are randomly constructed.

6. The computer-implemented method as recited in claim 1, wherein pretrained embeddings are used to construct said token embeddings.

7. The computer-implemented method as recited in claim 1 further comprising:
computing a loss function based on a quality of reconstruction from running said decoder artificial neural network;
updating internal parameters of said encoder artificial neural network and said decoder artificial neural network based on said computed loss function; and
using said final internal cell state of said encoder artificial neural network as said code representation vector in response to completing said running of said decoder artificial neural network and in response to convergence of said updated internal parameters of said encoder artificial neural network and said decoder artificial neural network.

8. The computer-implemented method as recited in claim 1, wherein said artificial neural network is a recurrent neural network.

9. A computer program product for representing source code in vector space, the computer program product comprising a computer readable storage medium having program code embodied therewith, the program code comprising the programming instructions for:
parsing source code into an abstract syntax tree;
traversing said abstract syntax tree to produce a sequence of tokens;
constructing token embeddings for a subset of said sequence of tokens;
inputting said token embeddings into an encoder artificial neural network for encoding said token embeddings;
initializing a decoder artificial neural network with a final internal cell state of said encoder artificial neural network when encoding said token embeddings;
running said decoder artificial neural network a same number of steps as encoding performed by said encoder artificial neural network;
using said final internal cell state of said encoder artificial neural network as a code representation vector in response to completing said running of said decoder artificial neural network; and
using said code representation vector to detect errors in said source code.

10. The computer program product as recited in claim 9, wherein said abstract syntax tree is traversed using a depth-first traversal.

11. The computer program product as recited in claim 9, wherein said abstract syntax tree is traversed using a structure-based traversal.

12. The computer program product as recited in claim 9, wherein the program code further comprises the programming instructions for:
constructing a list of frequently occurring tokens found in said abstract syntax tree; and
removing tokens from said sequence of tokens with a frequency below a frequency threshold to form said subset of said sequence of tokens.

13. The computer program product as recited in claim 9, wherein said token embeddings are randomly constructed.

14. The computer program product as recited in claim 9, wherein pretrained embeddings are used to construct said token embeddings.

15. The computer program product as recited in claim 9, wherein the program code further comprises the programming instructions for:
computing a loss function based on a quality of reconstruction from running said decoder artificial neural network;
updating internal parameters of said encoder artificial neural network and said decoder artificial neural network based on said computed loss function; and
using said final internal cell state of said encoder artificial neural network as said code representation vector in response to completing said running of said decoder artificial neural network and in response to convergence of said updated internal parameters of said encoder artificial neural network and said decoder artificial neural network.

16. The computer program product as recited in claim 9, wherein said artificial neural network is a recurrent neural network.

17. A system, comprising:
a memory for storing a computer program for representing source code in vector space; and
a processor connected to said memory, wherein said processor is configured to execute the program instructions of the computer program comprising:
parsing source code into an abstract syntax tree;
traversing said abstract syntax tree to produce a sequence of tokens;
constructing token embeddings for a subset of said sequence of tokens;
inputting said token embeddings into an encoder artificial neural network for encoding said token embeddings;
initializing a decoder artificial neural network with a final internal cell state of said encoder artificial neural network when encoding said token embeddings;
running said decoder artificial neural network a same number of steps as encoding performed by said encoder artificial neural network;
using said final internal cell state of said encoder artificial neural network as a code representation vector in response to completing said running of said decoder artificial neural network; and
using said code representation vector to detect errors in said source code.

18. The system as recited in claim 17, wherein said abstract syntax tree is traversed using a depth-first traversal.

19. The system as recited in claim 17, wherein said abstract syntax tree is traversed using a structure-based traversal.

20. The system as recited in claim 17, wherein the program instructions of the computer program further comprise:
  constructing a list of frequently occurring tokens found in said abstract syntax tree; and
  removing tokens from said sequence of tokens with a frequency below a frequency threshold to form said subset of said sequence of tokens.

\* \* \* \* \*